United States Patent
Satoh et al.

[11] Patent Number: 5,805,328
[45] Date of Patent: Sep. 8, 1998

[54] DRIVING CIRCUIT FOR AN OPTICAL SIGNAL MODULATOR

[75] Inventors: Hideaki Satoh; Kazuo Tanaka; Yukihiro Ozeki, all of Tokyo, Japan

[73] Assignee: Oki Electric Industry Company, Tokyo, Japan

[21] Appl. No.: 669,964

[22] Filed: Jun. 25, 1996

[30] Foreign Application Priority Data

Jun. 27, 1995 [JP] Japan .................................. 7-160555

[51] Int. Cl.$^6$ ...................................................... G02F 1/03
[52] U.S. Cl. ............................................. 359/245; 359/181
[58] Field of Search .................................. 359/245, 181, 359/182, 183

[56] References Cited

U.S. PATENT DOCUMENTS 5,347,392  9/1994  Chen et al. ............................ 359/279

*Primary Examiner*—Georgia Y. Epps
*Assistant Examiner*—Dawn-Marie Bey

*Attorney, Agent, or Firm*—Rabin & Champagne, P.C.

[57] ABSTRACT

An LN (Lithium Niobate) modulator outputs light Po modulated using a modulation voltage Vm. An inputted light signal average level monitor is arranged at the input of the LN modulator. Further, an outputted light signal average level monitor is arranged at the output of the LN modulator. A negative feedback circuit controls the feeding back of a bias voltage applied to the modulator from the average level of the input signal and the average level of the output signal. Further, a bias voltage limiter performs control in such a manner that the center of the voltage limiting range for the bias voltage becomes the optimum operating point. This bias voltage limiter has: a voltage limiter for limiting the operating output range of an op-amp to be a prescribed voltage range; an integrator for applying an offset voltage to and shifting the limiting voltage of the voltage limiter; and a difference monitor for monitoring the difference between a modulation voltage Vm and an offset voltage ΔV. The integrator generates an offset voltage based on shift information monitored by the difference monitor, with this offset voltage being provided to the voltage limiter. The voltage limiter then shifts the voltage control range in response to the provided offset voltage.

7 Claims, 15 Drawing Sheets

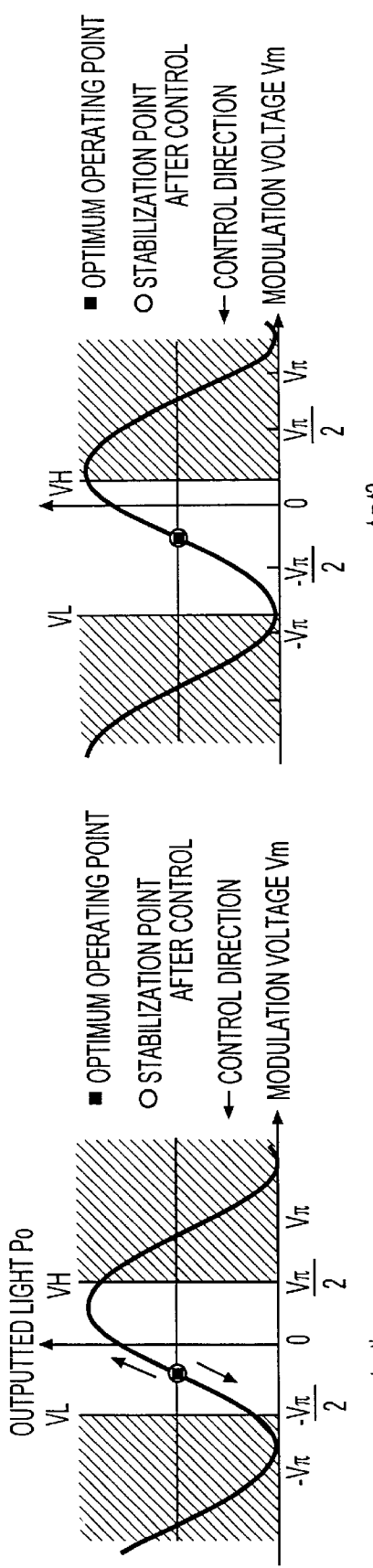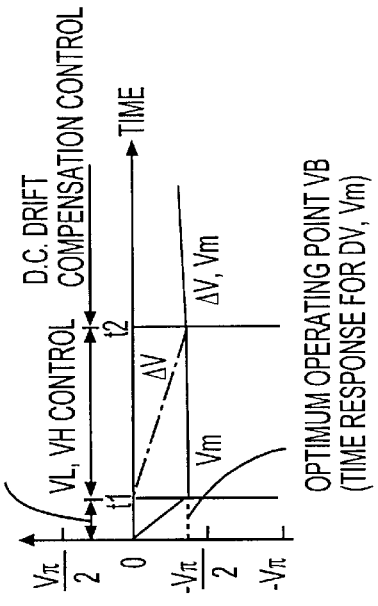
FIG. 9(a)
FIG. 9(b)
FIG. 9(c)

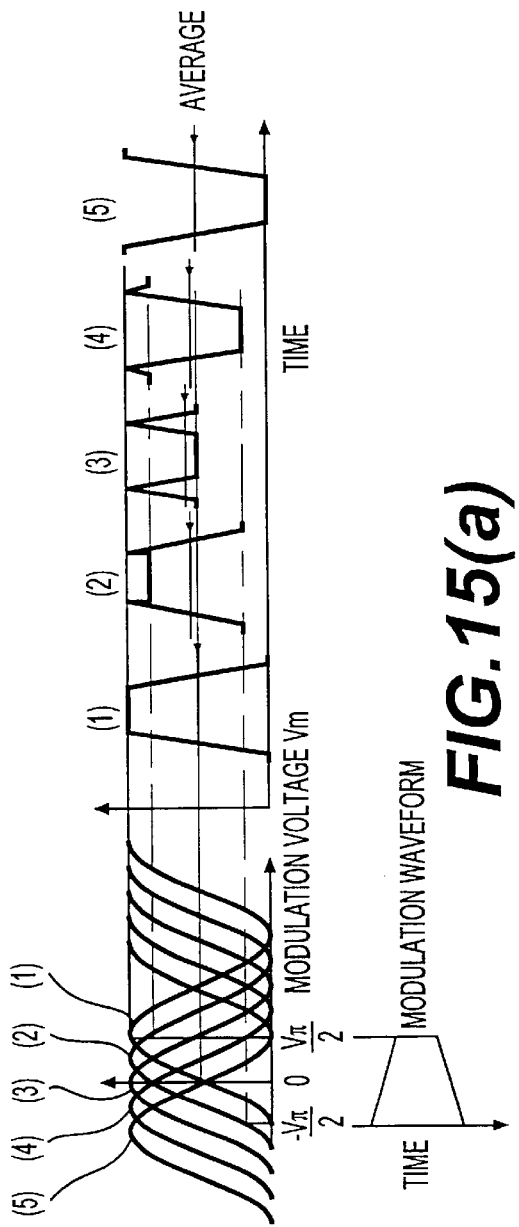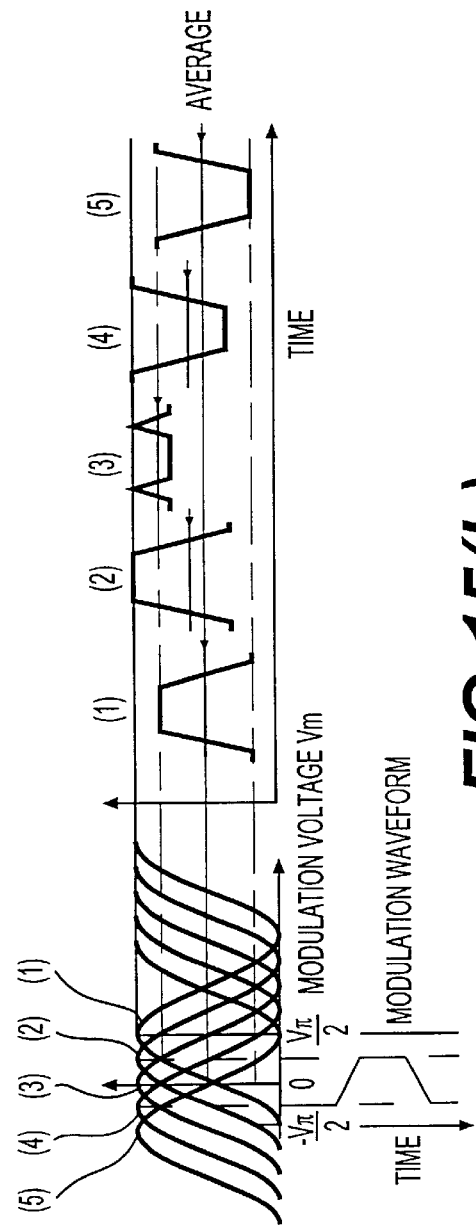

DRIVING CIRCUIT FOR AN OPTICAL SIGNAL MODULATOR

BACKGROUND OF THE INVENTION

1. Field of the Invention

The present invention relates to an optical repeater for use with an optical transmission system, and more particularly to a driver for a Lithium Niobate (LiNbO3) Mach-Zehnder-type optical modulator (hereinafter referred to as an "LN modulator") for use with optical repeaters.

2. Description of the Related Art

LN modulators are used in high-speed optical transmission devices such as 10 Gb/s optical transmission devices. With LN modulators, fluctuations (chirps) from the central wavelength of the modulated optical signal are few and ultra-high speed optical modulation is possible. Because of this, LN modulators are well suited to use in phase modulators occurring in long distance optical transmission systems or coherent light transmission systems etc. However, it is well known that d.c. voltage drifts having extremely long time constants occur in LN modulators. Because of these d.c. voltage drifts, the optimum operating points for these LN modulators shift with respect to time and distortion occurs in the waveform of the outputted light. A controller is therefore necessary for applying the optimum operating voltage to the LN modulators in response to the d.c. voltage drift so as to compensate for the d.c. drift of the LN modulators and obtain stable outputted light waveforms over long periods of time.

Negative feedback circuits which, for example, monitor the level of the light signal inputted to the LN modulator and monitor the level of the outputted light signal and then control the biasing of the LN modulator in such a manner that this ratio becomes fixed also exist as control circuits for carrying out this voltage compensation.

SUMMARY OF THE INVENTION

It is the object of the present invention to provide a controller for a modulator capable of stabilizing a modulator to an optimum operating point regardless of the modulation characteristics of the modulator.

It is a further object of the present invention to provide a modulator capable of following shifts in the optimum operating point due to d.c. voltage drifts occurring at the modulator so as to operate in a stable manner.

Namely, in a first aspect of the present invention, the modulator has an optical waveguide capable of changing the refractive index based on an electric field generated by an externally applied voltage. Part of the inputted light passes straight through the optical waveguide and a light output which is a modulated form of the inputted light is generated. Means for monitoring the average level of the light signal is disposed both at input and output sides of the modulator. Feedback of the bias voltage applied to the modulator is controlled from the average level of the input signal and the average level of the output signal. A voltage limiting range is set for stabilization of the feedback control. This voltage limiting range automatically shifts so as an operating point is always set at the middle of the range. Changes in the optimum operating point due to d.c. voltage drift can also be followed.

Further, in a second aspect of the present invention, means are provided to ensure that the duty ratio of the modulation signal applied to the LN modulator does not depend on the duty ratio of the data signal.

BRIEF DESCRIPTION OF THE DRAWINGS

FIG. 8 to FIG. 11 show a sequence illustrating the operation of the bias voltage limiter shown in FIG. 6;

FIG. 15 is a view illustrating changes in the waveform of the outputted light when a d.c. drift occurs at the LN modulator.

DESCRIPTION OF THE PREFERRED EMBODIMENTS

First Embodiment

Figure 1:
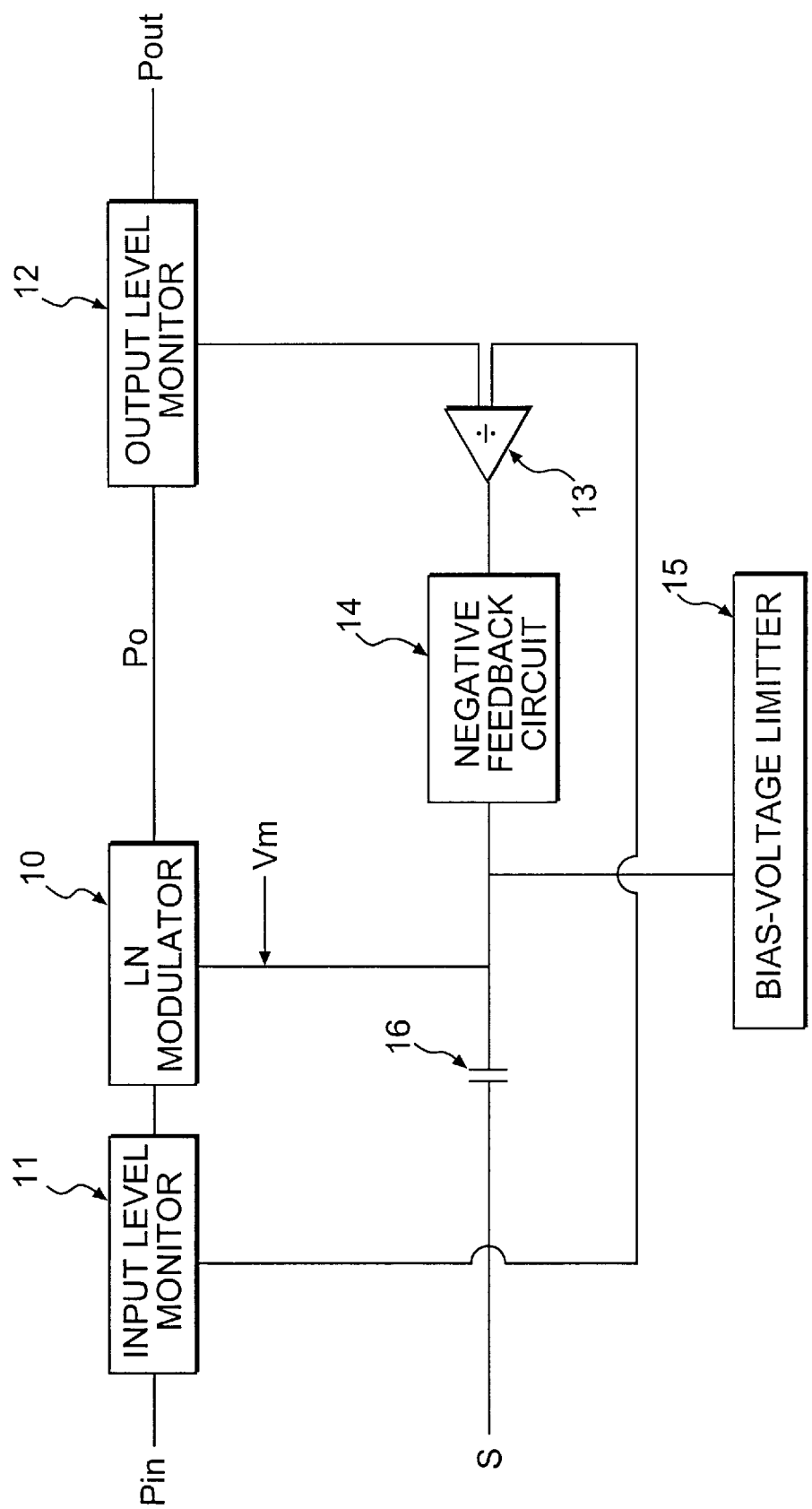
FIG. 1 is a block diagram showing a first embodiment of the present invention.

The following is a description of an LN optical modulator and a bias voltage controller of the present invention. The first embodiment is shown in FIG. 1.

An input level monitor 11 for monitoring the average level of inputted light is arranged at the input of an LN modulator 10 and an output level monitor 12 for monitoring the average level of outputted light is arranged at the output of the LN modulator 10. The outputs of the input level monitor 11 and the output level monitor 12 are provided to a divider 13, with the output of the divider 13 then being provided to a negative feedback circuit 14. A bias voltage limiter 15 is connected to the output of the negative feedback circuit 14.

A modulation signal S is provided to the LN modulator 10 via a capacitor 16. The output voltage of the negative feedback circuit 14 and the output voltage of the bias voltage limiter 15 are superimposed with this modulation signal S and a modulation voltage Vm is generated.

Figure 2:
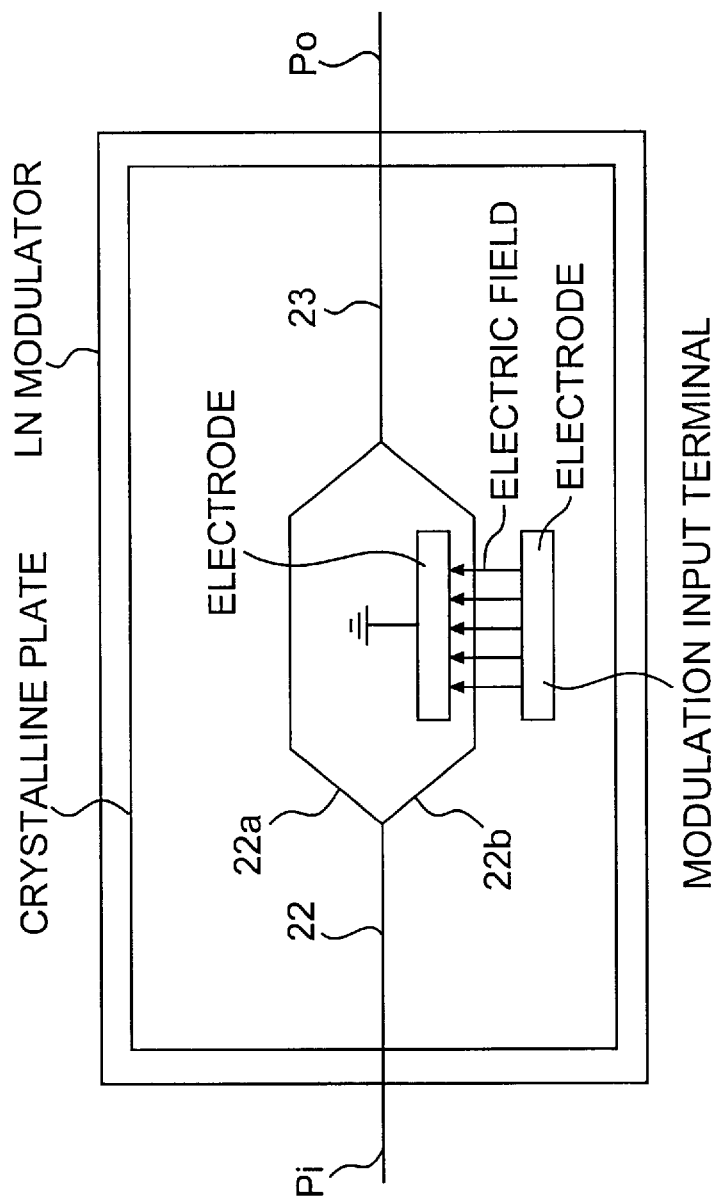
FIG. 2 shows the structure of an LN modulator.

The structure of the LN modulator 10 is shown in FIG. 2. At the LN modulator 10, an optical waveguide 22 to which inputted light Pi is inputted is formed within a crystalline plate 21 of Lithium Niobate (LiNbO3). The optical waveguide 22 diverges into a first path 22a and a second path 22b. These paths 22a and 22b are connected to an output side optical waveguide 23. Electrodes 24 and 25 are arranged on either side of the diverging path 22b, with the electrode 24 being grounded and the electrode 25 being connected to a modulation input 26. The modulation voltage Vm is applied to the modulation input 26.

This LN modulator 10 generates an electric field E between the electrodes 24 and 25 using the modulation voltage applied to the modulation input. The phase of light passing through the diverging path 22b can then be changed by changing the refractive index of the diverging path 22b using this electric field E. Namely, the phase of light reaching the optical waveguide 23 after passing through the diverging path 22a is unchanged but the phase of light reaching the optical waveguide 23 after passing through the diverging path 22b is changed. Outputted light Po resulting from interference between light from both light paths is then outputted.

Figure 3:
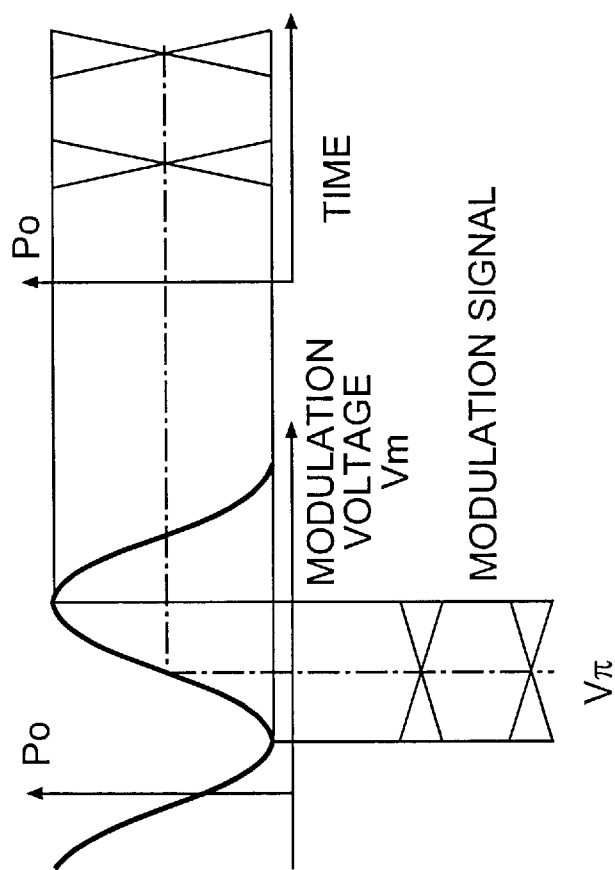
FIG. 3 is a wave diagram illustrating the operation of the LN modulator shown in FIG. 2.

FIG. 3 shows a wave diagram illustrating the operation of the LN modulator 10 shown in FIG. 2. As described previously, the LN modulator 10 changes the light output by changing the phase of the light. Because of this, the light output Po is periodically changed with respect to the modulation voltage Vm. The desired optical output waveform can then be obtained by driving the LN modulator 10 using a modulation signal having an amplitude equal to a modulation voltage (hereinafter referred to as $V\pi$) corresponding to half of the transition period of the light output Po.

Figure 4:
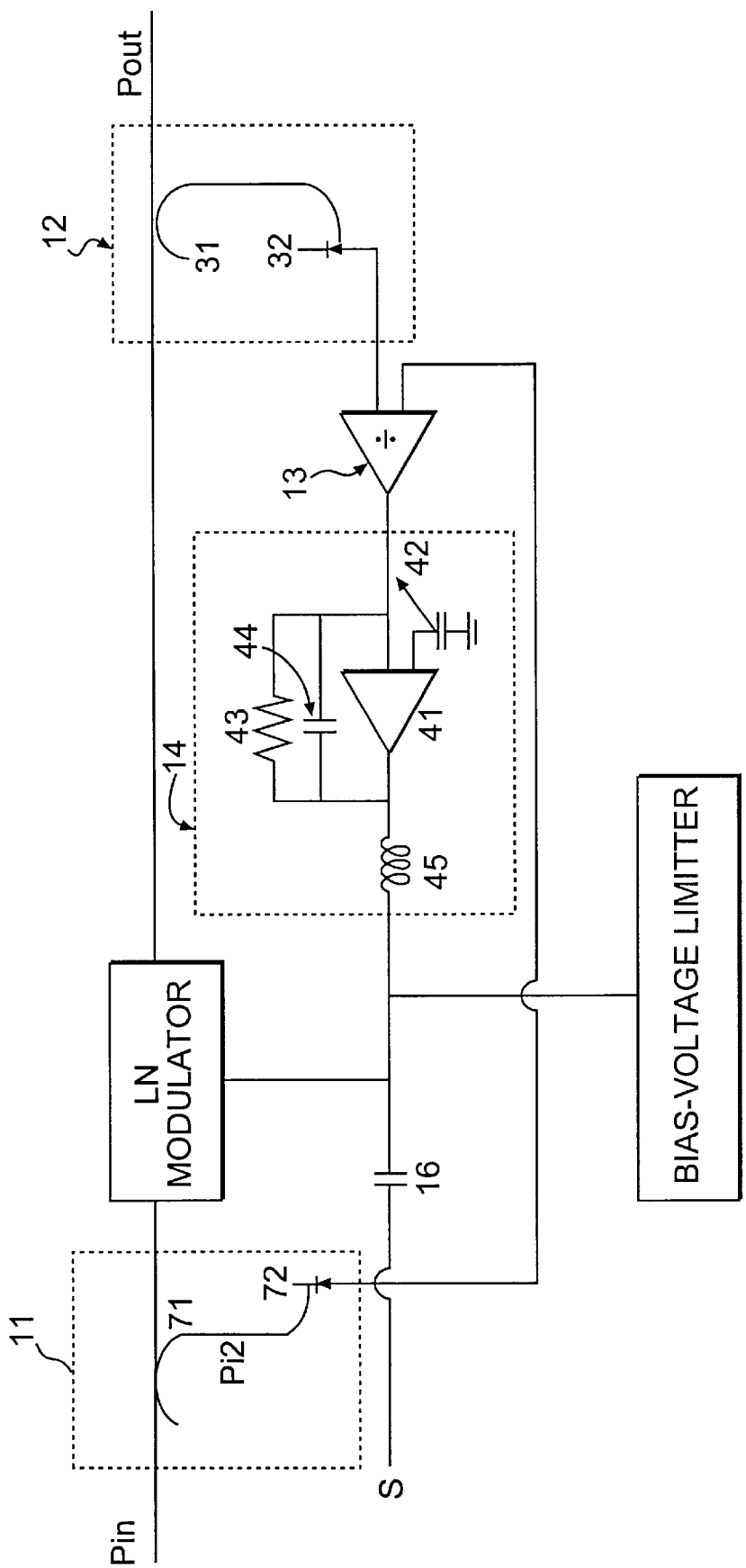
FIG. 4 is a view illustrating the details of the first embodiment shown in FIG. 1.

FIG. 4 describes the input level monitor 11, output level monitor 12 and negative feedback circuit 14 shown in FIG. 1 in detail. The inputted light Pin is inputted to an optical coupler 71 within the input level monitor 11. The optical coupler 71 splits the inputted light up into inputted light Pi1 and inputted light Pi2, with Pi1 being inputted to the LN modulator 10 and Pi2 being inputted to a photodiode (hereinafter referred to as "PD") 72. The PD 72 outputs a current proportional to the optical power of the inputted light Pi2, with this current being provided to another input of the divider 13.

Outputted light Po modulated by the modulation voltage Vm is outputted from the LN modulator 10. This outputted light Po is inputted to an optical coupler 31 within the output level monitor 12. The optical coupler 31 splits the outputted light Po up into outputted light Po1 and outputted light Po2, with Pi1 finally being outputted as the outputted light Pout. On the other hand, Po2 is inputted to the PD 32. The PD 32 then outputs a current proportional to the optical power of the outputted light Po2, with this current being provided to one of the inputs of the divider 13.

The divider 13 monitors the average optical power transmission rate (proportion of the average level of the outputted light with respect to the average level of the inputted light Pi) based on the two currents provided. The output voltage is then outputted in response to the average optical power transmission rate and provided to the negative feedback circuit 14.

The negative feedback circuit 14 has an operational amplifier (hereinafter referred to as an "op-amp") 41. The output voltage of the divider 13 is provided to the inverting input of this op-amp 41. A variable reference voltage source 42 is connected to the non-inverting input of the op-amp 41. Further, the output of the op-amp 41 is connected back to the inverting input via a resistor 43. A capacitor 44 is connected in parallel with the resistor 43.

The output of the op-amp 41 is connected to the modulation input of the LN modulator 10 via a coil 45. The modulation signal S is inputted to the modulation input of the LN modulator 10 via a capacitor 16. As mentioned above, the output voltage of the op-amp 41 and the output voltage of the bias voltage limiter 15 are superimposed with the modulation signal S and a modulation voltage Vm is generated.

The negative feedback circuit 14 controls the voltage provided to the LN modulator 10 using a time constant determined by the resistor 43 and the capacitor 44, based on the output voltage of the divider 13, in the following way. Namely, when the input voltage going to the negative feedback circuit 14 increases, the negative feedback circuit 14 biases the modulation voltage of the LN modulator 10 so that the optical power of the output of the LN modulator 10 is reduced. In other words, the negative feedback circuit 14 biases the modulation voltage of the LN modulator 10 in such a manner that the average optical power transmission rate becomes a fixed value decided by the variable reference voltage source 42. Control of the bias voltage can therefore be carried out in a stable manner regardless of fluctuations in the power of light inputted to the LN modulator 10 and regardless of d.c or light pulse in the inputted light signal.

Figure 5:
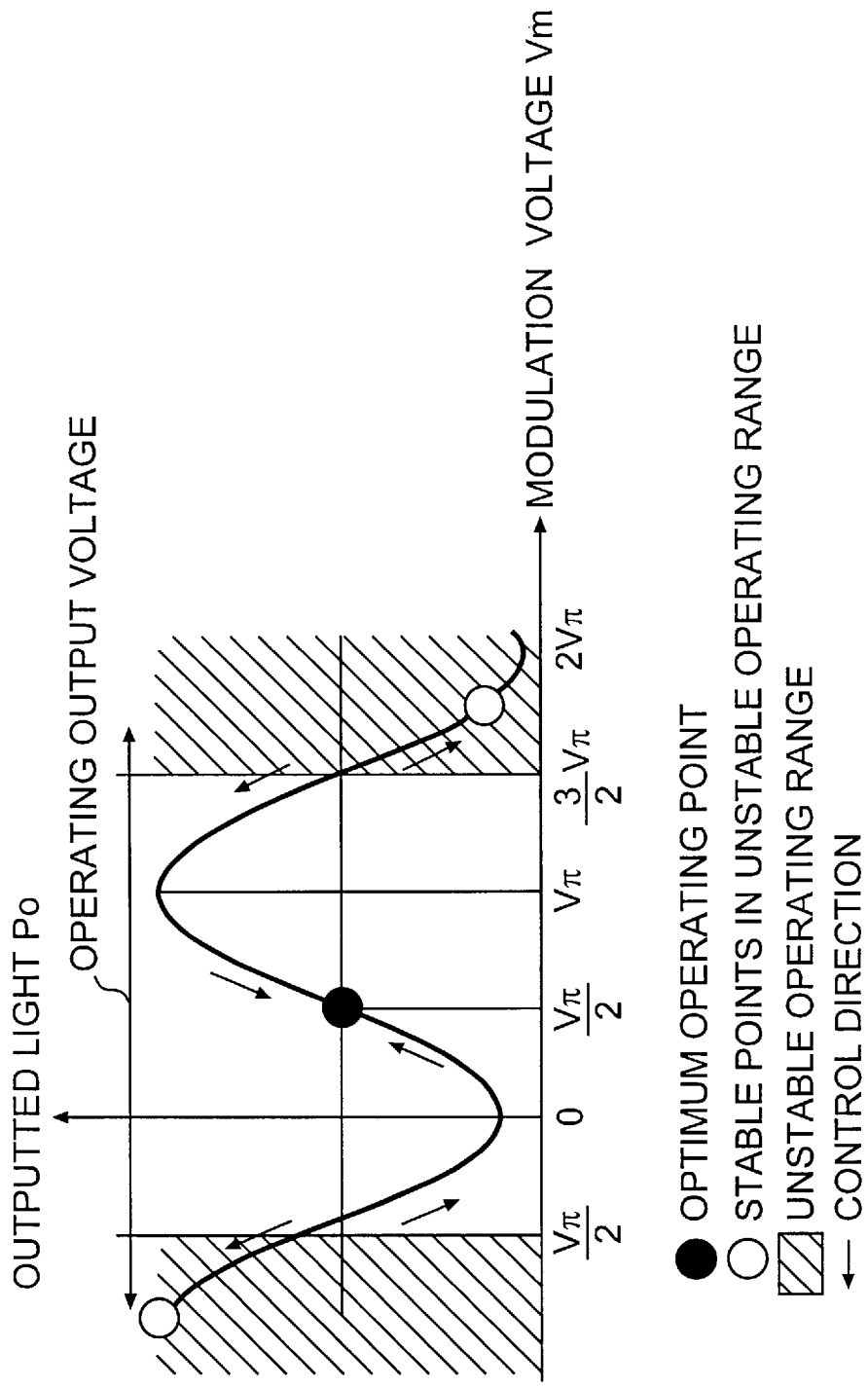
FIG. 5 is a wave diagram illustrating the operation of the first embodiment shown in FIG. 4.
Figure 6:
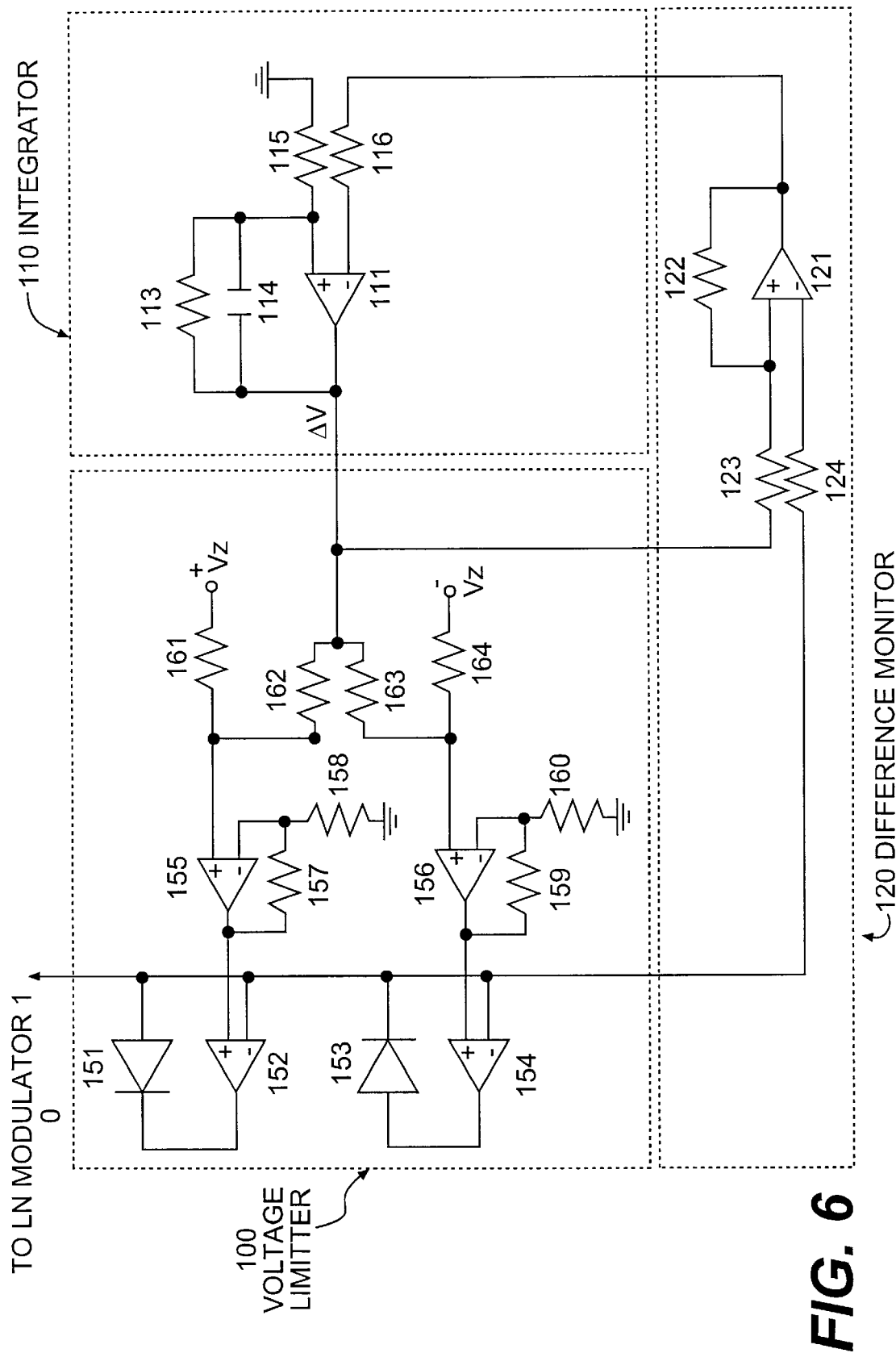
FIG. 6 is a view illustrating the details of the bias voltage limiter shown in FIG. 4.

The present invention further has a bias voltage limiter 15. However, in order to clearly understand the operation of the bias voltage limiter 15, it is assumed that the present invention does not have the bias voltage limiter shown in FIG. 6. The wave diagram at this time is shown in FIG. 5. In the wave diagram in FIG. 5, the vertical axis expresses the outputted light Po and the horizontal axis expresses the modulation voltage Vm applied to the LN modulator 10. The LN modulator 10 has an optimum operating point shown by ● in FIG. 5 and has an operating output range between the two points shown by ○ in FIG. 5.

As an example, let it be assumed that the optical output of the LN modulator 10 is a minimum when the modulation voltage Vm=0. The light outputted then becomes a maximum at modulation voltage $Vm=V\pi$ and the optimum operating point becomes $Vm=V\pi/2$.

As shown in FIG. 4, the bias voltage controller uses the negative feedback circuit 14. The effect of this is that the bias voltage falls when the average power transmission rate of the LN modulator 10 is high compared with the optimum operating conditions. On the other hand, when the average power transmission rate is low compared with the optimum operating conditions, the bias voltage goes up. For example, the instant the power supply for the bias voltage controller is thrown, when the modulation voltage is biased in the range of $Vm<-V\pi/2$, the operating point stabilizes at the minimum value of the operating output range of the op-amp 41. Conversely, when the modulation voltage is biased in the range $Vm>3V\pi/2$, the operating point settles at the maximum value of the operating output range of the op-amp 41.

In this way, cases also occur where the most suitable light output waveforms cannot be obtained. Generally, the optimum operating point of the LN modulator 10 varies by an arbitrary voltage within one period due to the operating characteristics of the LN modulator 10. It is therefore necessary to separately adjust the operating output range of the op-amp 41 every time the power supply is turned on in order to resolve the aforementioned inconvenience. Further, the optimum operating point of the LN modulator 10 also changes due to d.c. voltage drift. It is therefore difficult for the optimum operating point to settle for a long time from the moment the power supply is switched on.

It is because of this that the bias voltage limiter 15 has been added to the present invention and the center of the voltage-limiting range of the bias voltage is made to stabilize at the optimum operating point. Changes in the optimum operating point due to d.c. voltage drift can also be followed. The bias voltage limiter 15 is described in detail in the following using FIG. 6.

The bias voltage limiter 15 of the present invention has: a voltage limiter 100 for limiting the operating output range of the op-amp 41 to a predetermined voltage range; an integrator 110 for adding an offset voltage to the limiting voltage of the voltage limiter 100 in order to perform shifting; and a difference monitor 120 for monitoring the difference between the modulation voltage Vm and an offset voltage $\Delta V$.

The voltage limiter 100 has a positive voltage source +Vz and a negative voltage source -Vz. The positive voltage +Vz is applied to the non-inverting input of an op-amp 155 via a resistor 161. The negative voltage -Vz is applied to the non-inverting input of an op-amp 156 via a resistor 164. The inverting input of the op-amp 155 is grounded via a resistor 158, and the inverting input of the op-amp 156 is also grounded via a resistor 160. The output of the op-amp 155 is connected to the inverting input thereof via a resistor 157. The output of the op-amp 156 is connected to the inverting input thereof via a resistor 159.

The output of the op-amp 155 is connected to the non-inverting input of an op-amp 152, and the output of the op-amp 156 is connected to the non-inverting input of an op-amp 154. Inverting inputs of the op-amp 152 and the op-amp 154 are connected to the LN modulator 10. The output of the op-amp 152 is connected to a cathode of a diode 151, and the output of the op-amp 154 is connected to an anode of a diode 153. The anode of the diode 151 and the cathode of the diode 153 are connected the LN modulator 10.

The integrator 110 has an op-amp 111. The output of the op-amp 111 is connected to the inverting input of the op-amp 111 via a resistor 113. A capacitor 114 is connected in parallel with this resistor 113. The inverting input of the op-amp 111 is connected to earth via a resistor 115. This output of the op-amp 111 is connected to the anode of the zener diode 101 and the cathode of the zener diode 102.

The difference monitor 120 has an op-amp 121. The output of the op-amp 121 is connected to the non-inverting input of the op-amp 111 via a resistor 116. The output of the op-amp 121 is also connected to the inverting input of the op-amp 121 via a resistor 122. The inverting input of the op-amp 121 is connected to the anode of the zener diode 101 and the cathode of zener diode 102 via a resistor 123. Further, the non-inverting input of the op-amp 121 is connected to the connection point of the cathode of the zener diode 101 and the anode of the zener diode 102 via a resistor 124.

Next, the operation of the bias voltage limiter 15 is described. First, the bias voltage Vm for the LN modulator 10 is fixed (i.e. the minimum and maximum values of the bias voltage Vm are fixed) at a prescribed voltage range by the voltage limiter 100 assuming that the integrator 110 and the difference monitor 120 are not present at the bias voltage limiter 15. The minimum value of the bias voltage Vm is then defined to be VL and the maximum value is defined to be VH.

FIG. 7 is a view describing variations in the optimum operating point due to the modulation characteristics of the LN modulator 10. The minimum value VL and maximum value VH for the bias voltage are now assumed to be $VL=-V\pi/2$ and $VH=V\pi/2$. If the differences of the optimum operating points are then classified, the four conditions shown in FIG. 7(a) to (d) can be considered.

Figure 7A:
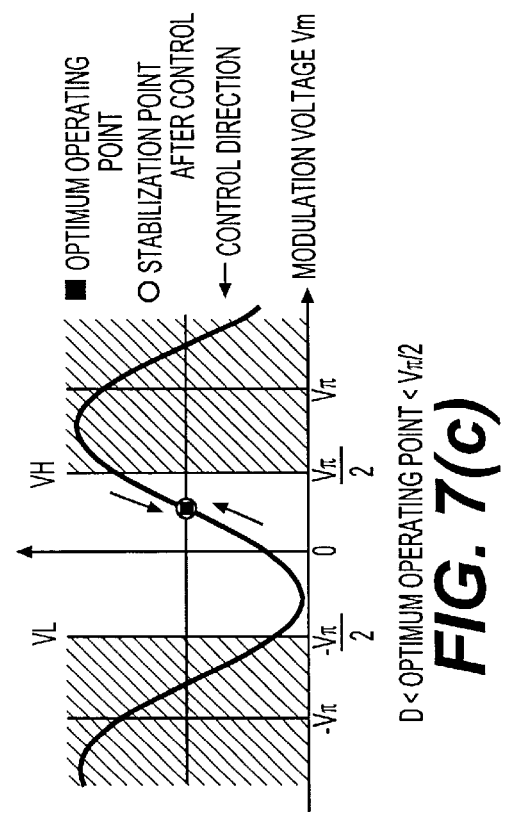
FIG. 7 is a view illustrating changes in the optimum operating point caused by the modulation characteristics of the modulator.
Figure 7B:
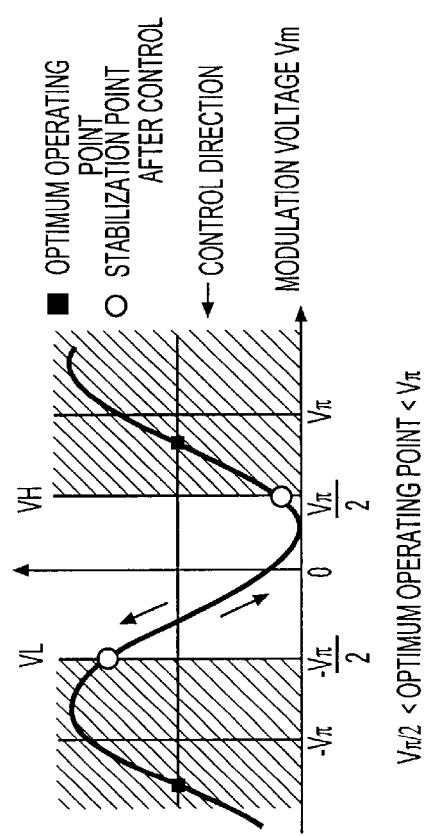

In the case of FIG. 7(b) and (c), i.e. when $-V\pi/2<$optimum operating point$<V\pi/2$:

VL and VH are then defined by the following equations.

$$VL=-VZ+\Delta V \quad (1)$$

$$VH=VZ+\Delta V \quad (2)$$

Here, VZ is the voltage which provides an initial value for the bias voltage limiting range and $\Delta V$ is the offset voltage of VL and VH from when the power supply is turned-on.

The bias voltage at the optimum operating point is taken to be VB and the following equation has to be fulfilled so that VB is at the center of the bias voltage limiting range.

$$VH-VB=-(VL-VB) \quad (3)$$

If equations (1) and (2) are substituted into equation (3), the following equation (4) is obtained.

$$VB=\Delta V \quad (4)$$

Namely, the difference monitor 120 monitors the difference $VB-\Delta V$, with this difference signal then being provided to the integrator 110. $\Delta V$ is controlled by the integrator 110 in such a manner that $VB-\Delta V=0$. It is then preferable for the time constant of the bias voltage limiter 15 to be decided by the resistor 113 and the capacitor 114. Further, when the bias voltage is limited using VL and VH, it is necessary for VH-VL to be less than $2V\pi$ so that the controller for the LN modulator 10 operates in a stable manner. The conditions of the following equation (5) are therefore necessary for VZ in order to achieve this.

$$VZ<V\pi \quad (5)$$

In the following description, voltage VZ is assumed to be $VZ=V\pi/2$. This assumption is made to explain the operation of how the offset voltage $\Delta V$ is controlled and the point of stabilization of the bias voltage is made to coincide with the optimum operating point for the four cases in FIG. 7.

First, a description is given using FIG. 8 with regards to the control for the case shown in FIG. 7(a) where $-Vm<$optimum operating point$<-V\pi/2$.

Figure 8A:
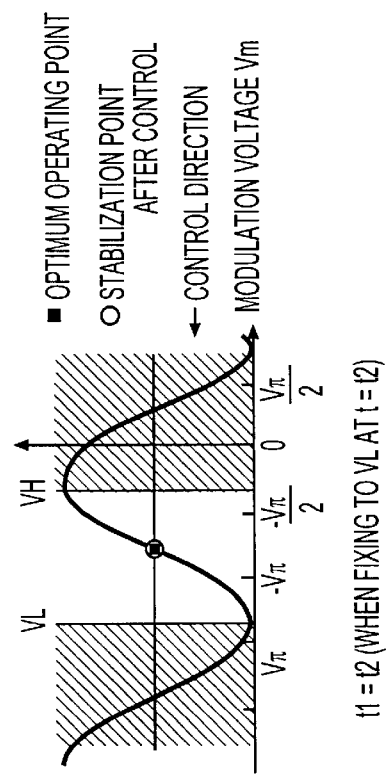
Figure 8D:
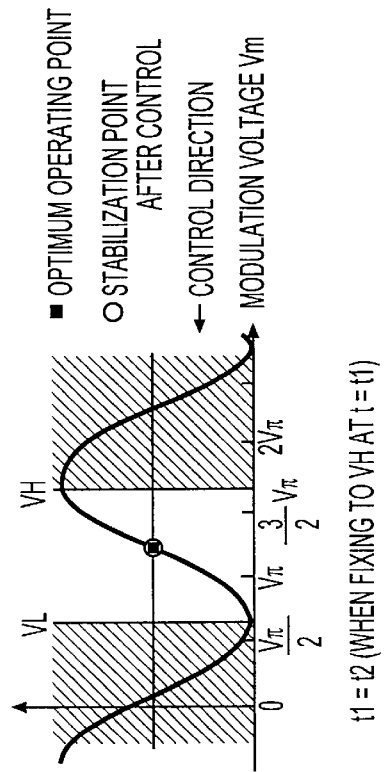
Figure 8B:
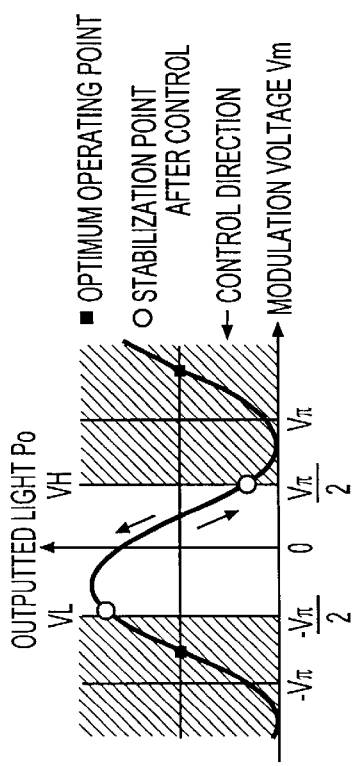
Figure 8C:
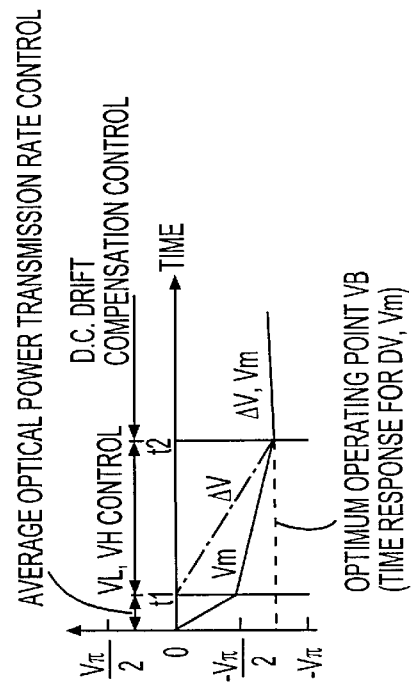

The stabilizing conditions for the case of FIG. 7(a) when time t=t1 are shown in FIG. 8(a). In this case, the optimum operating point is not within the bias voltage limiting range. Because of this, the bias voltage Vm is fixed at VL or VH. The integrator 110 now keeps the generated offset voltage $\Delta V$ low when the bias voltage is fixed at $VL=-\pi/2$. As a result, there is stabilization at the conditions of FIG. 8(c) with the bias voltage between $-V\pi$ and $-V\pi/2$ at a time t2 where $\Delta V$ of equation (4) becomes equal to VB. The time response of VB and $\Delta V$ at this time is shown in FIG. 8(b).

On the other hand, the integrator 110 keeps the generated offset voltage $\Delta V$ high when the bias voltage is fixed at $VH=V\pi/2$ at a time t1. As a result, there is stabilization at the conditions of FIG. 8(d) with the bias voltage between $V\pi$ and $V\pi 2$ at a time t2 where $\Delta V$ of equation (4) becomes equal to VB.

In these cases, control of the bias voltage is carried out by the negative feedback circuit 14 in the directions shown by the arrows in the drawings within the aforementioned voltage limiting range ($-V\pi/2 \sim V\pi/2$). The point of stabilization after control therefore settles in such a manner as to coincide with the optimum operating point. However, in this case also, the point of stabilization cannot follow the d.c. voltage drift of the LN modulator 10 and shifting from the optimum operating point occurs.

For the case in FIG. 7(a) or (d), where $-Vm<$optimum operating point$<V\pi/2$ and $V\pi/2<$optimum operating point$<V\pi$:

In these cases, control of the bias voltage is carried out by the negative feedback circuit 14 in the directions shown by the arrows in the drawings and the point of stabilization and the optimum operating point therefore do not coincide after control. Namely, the aforementioned drawback where the initially assumed minimum value VL and maximum value VH for the bias voltage Vm are fixed occurs and it is therefore necessary to shift the range of the voltage control. Therefore, in the present invention, shift information for control is monitored by the difference monitor 120, with the integrator 110 then generating an offset voltage based on this monitoring information. This offset voltage is provided to the voltage limiter 100. The voltage limiter 100 then shifts the range of the voltage control in response to this provided offset voltage. The range of the voltage control after shifting is then referred to as the bias voltage limiting range. After shifting, the maximum value of the bias voltage becomes (VH+ΔV), the minimum value becomes (VL+ΔV) and the voltage difference between the maximum and minimum values before and after shifting becomes fixed.

From the time t2 onwards, the optimum operating point changes due to the d.c. voltage drift of the LN modulator 10. An offset voltage ΔV following this change is generated by the integrator 110, with the optimum operating point VB always being made to stabilize within the bias voltage limiting range.

Next, control for the case shown in FIG. 7(b) where −Vπ/2<optimum operating point<0 is described using FIG. 9.

The stabilizing conditions at the time t=t1 for the case in FIG. 7(b) are shown in FIG. 9(a). In this case, the optimum operating point VB is positioned within the bias voltage limiting range. Because of this, the bias voltage Vm first stabilizes at the optimum operating point VB. This optimum operating point VB, however, is not positioned at the center of the bias voltage limiting range and the integrator 110 therefore keeps the generated offset voltage ΔV down. After this, stabilization takes place at a time t2 at which the operating point is in the center of the bias voltage limiting range (i.e. when ΔV=VB). The time response of VB and ΔV at this time is shown in FIG. 9(b). After this, the integrator 110 controls the value of ΔV in response to the d.c. voltage drift and the optimum operating point always stabilizes at the center of the bias voltage limiting range, in the same way as for the case in FIG. 8.

Figure 7C:
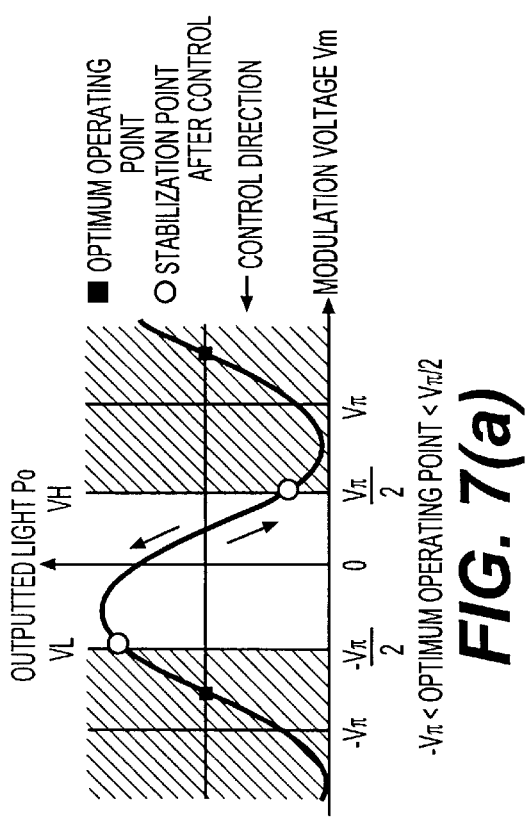
Figure 10A:
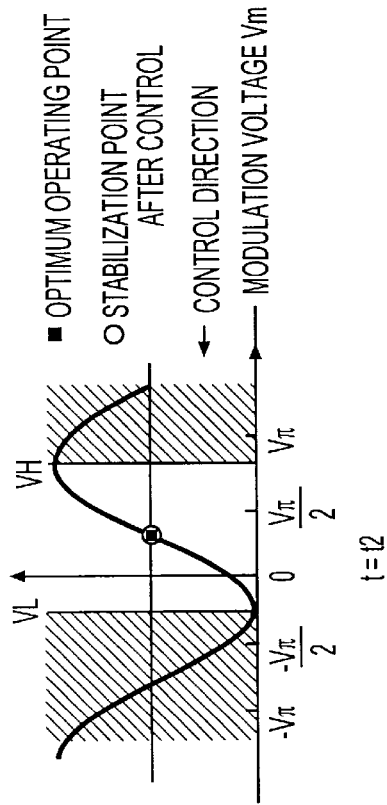
Figure 10C:
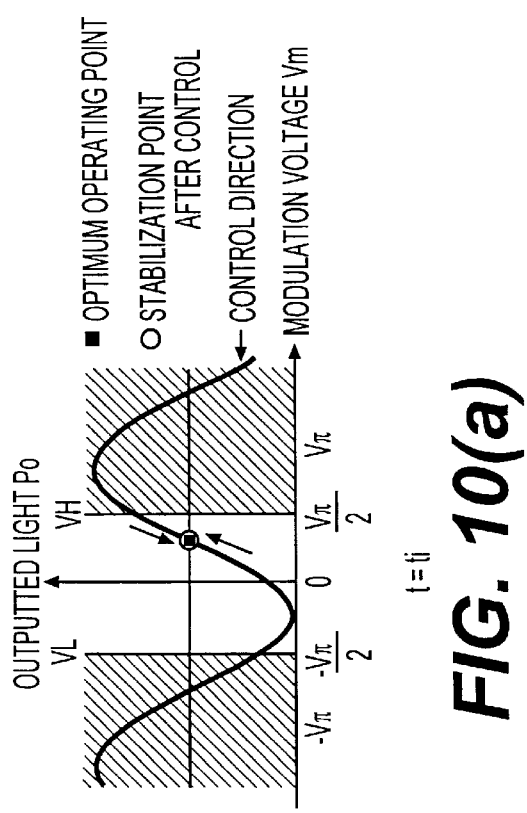

Next, control for the case shown in FIG. 7(c) where 0<optimum operating point<Vπ/2 is described using FIG. 10.

Figure 10B:
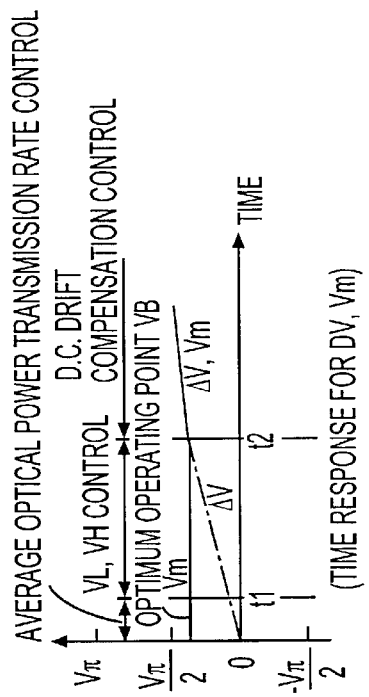

The stabilizing conditions at the time t=t1 for the case of FIG. 7(c) are shown in FIG. 10(a). The optimum operating point VB is positioned within the bias voltage limiting range in this case also. As a result, the bias voltage Vm first stabilizes at the optimum operating point VB. This optimum operating point is not, however, positioned at the middle of the bias voltage limiting range and the integrator 110 therefore keeps the generated offset voltage ΔV high. After this, stabilization takes place at a time t2 when the operating point is at the center of the bias voltage limiting range (i.e. when ΔV=VB). The time response for VB and ΔV at this time is shown in FIG. 10(b).

Figure 7D:
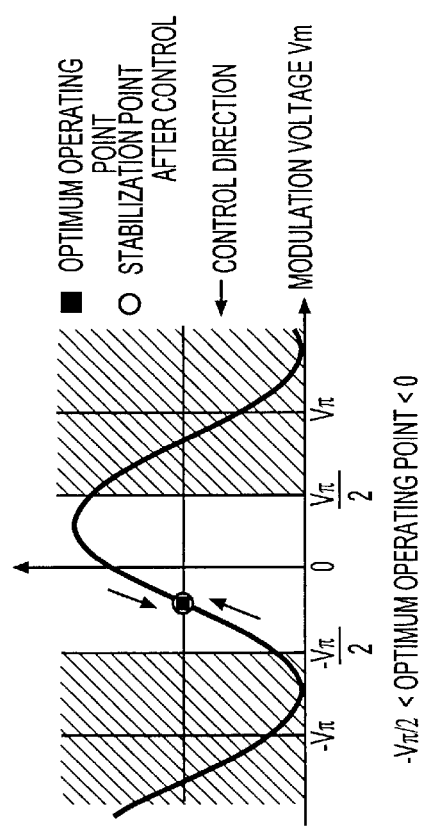

Finally, control in the case shown in FIG. 7(d) where Vπ/2<optimum operating point<Vπ is described using FIG. 11.

Figure 11A:
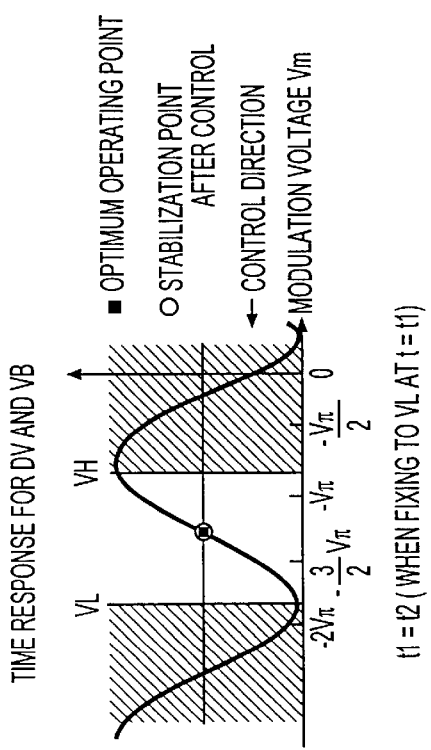
Figure 11C:
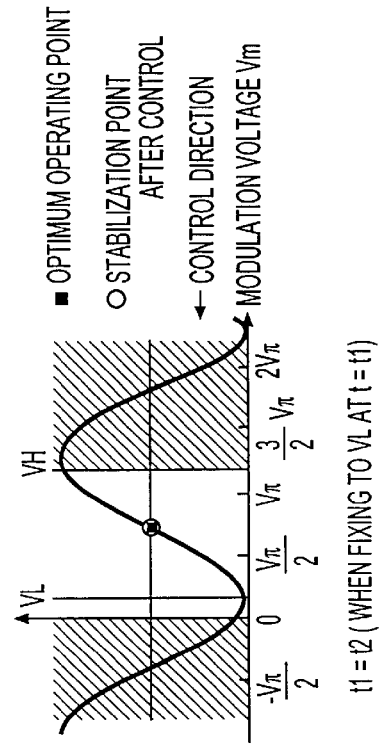
Figure 11B:
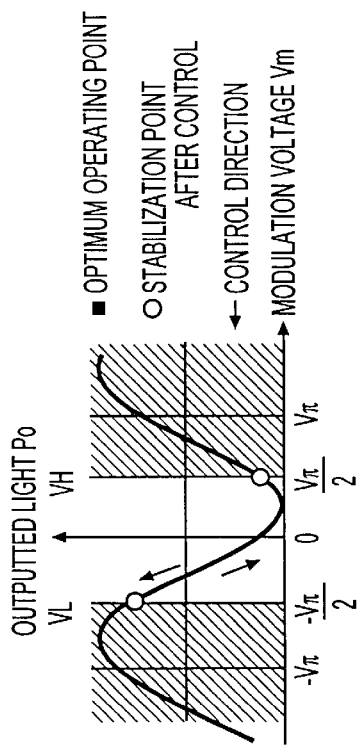
Figure 11D:
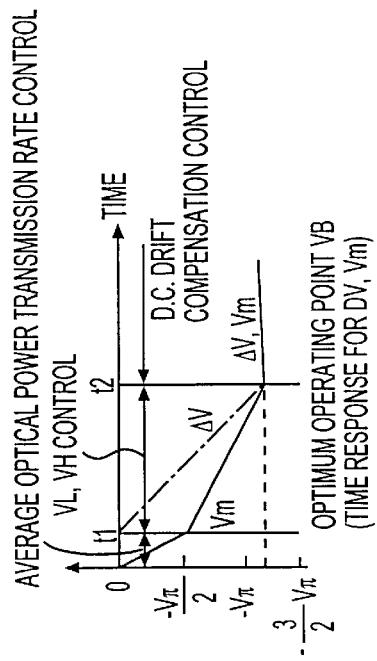

The stabilizing conditions at the time t=t1 for the case of FIG. 7(d) are shown in FIG. 11(a). In this case, the optimum operating point is not within the bias voltage limiting range, with the bias voltage being fixed at VL or VH as a result. When the bias voltage is fixed at VL=−Vπ/2, the integrator 110 keeps the generated offset voltage ΔV low. As a result, stabilizing takes place at the conditions of FIG. 11(c) with the bias voltage between −Vπ and −3Vπ/2 at a time t2 when ΔV of equation (4) becomes equal to VB. The time response of VB and ΔV at this time is shown in FIG. 11(b).

On the other hand, when the bias voltage is fixed at VH=Vπ/2 at the time t1, the integrator 110 keeps the generated offset voltage ΔV high. Stabilization therefore takes place at the conditions of FIG. 11(d) with the bias voltage between Vπ/2 and Vπ and at a time t2 where ΔV of equation (4) becomes equal to VB.

From the time t2 onwards, the integrator 110 controls the value of ΔV in response to the d.c. voltage drift and the optimum operating point VB is always made to stabilize at the center of the bias voltage limiting range, in the same way as the case in FIG. 8.

As becomes clear from the above description, the bias voltage is automatically stabilized to the optimum operating point, no matter how the optimum operating point varies due to the modulation characteristics of the modulator. Further, even if the optimum operating point shifts subsequently due to d.c. voltage drifting, the bias voltage will follow (this shifting).

Second Embodiment

Figure 12:
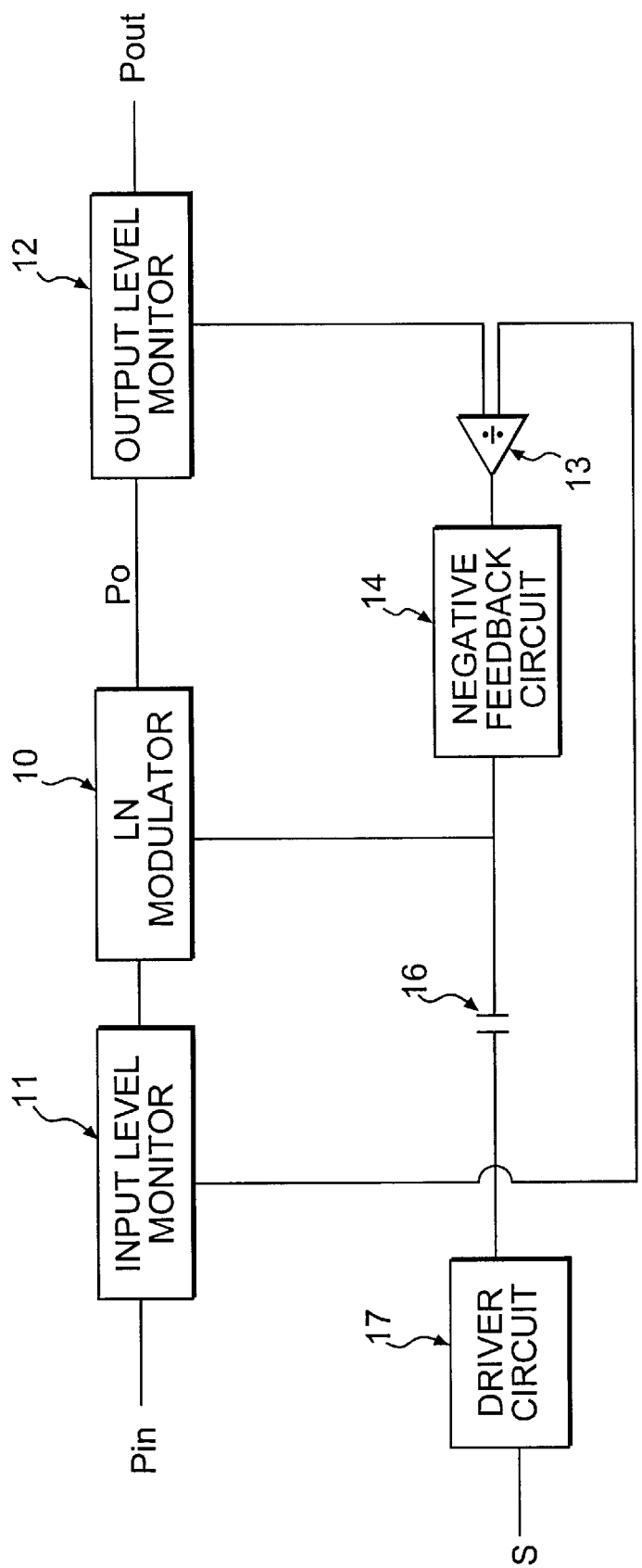
FIG. 12 is a block diagram showing a second embodiment of the present invention.
Figure 13:
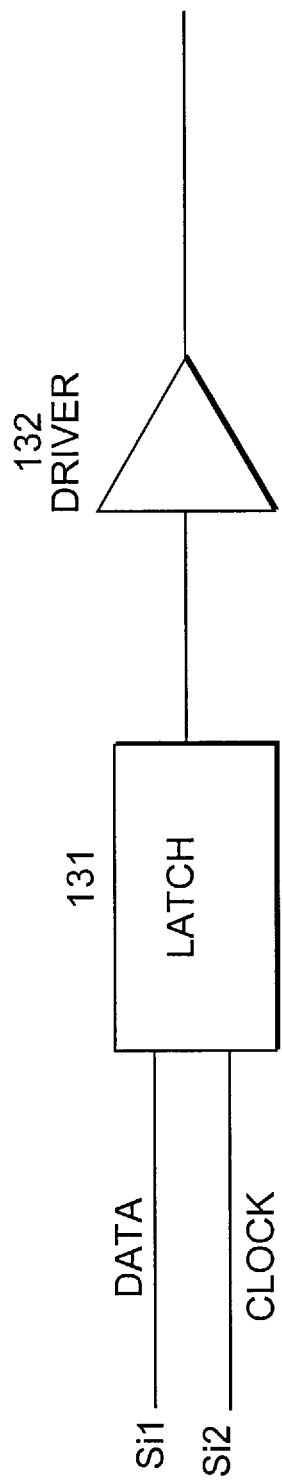
FIG. 13 and FIG. 14 are views showing the detailed structure of the driver shown in FIG. 12.
Figure 14:
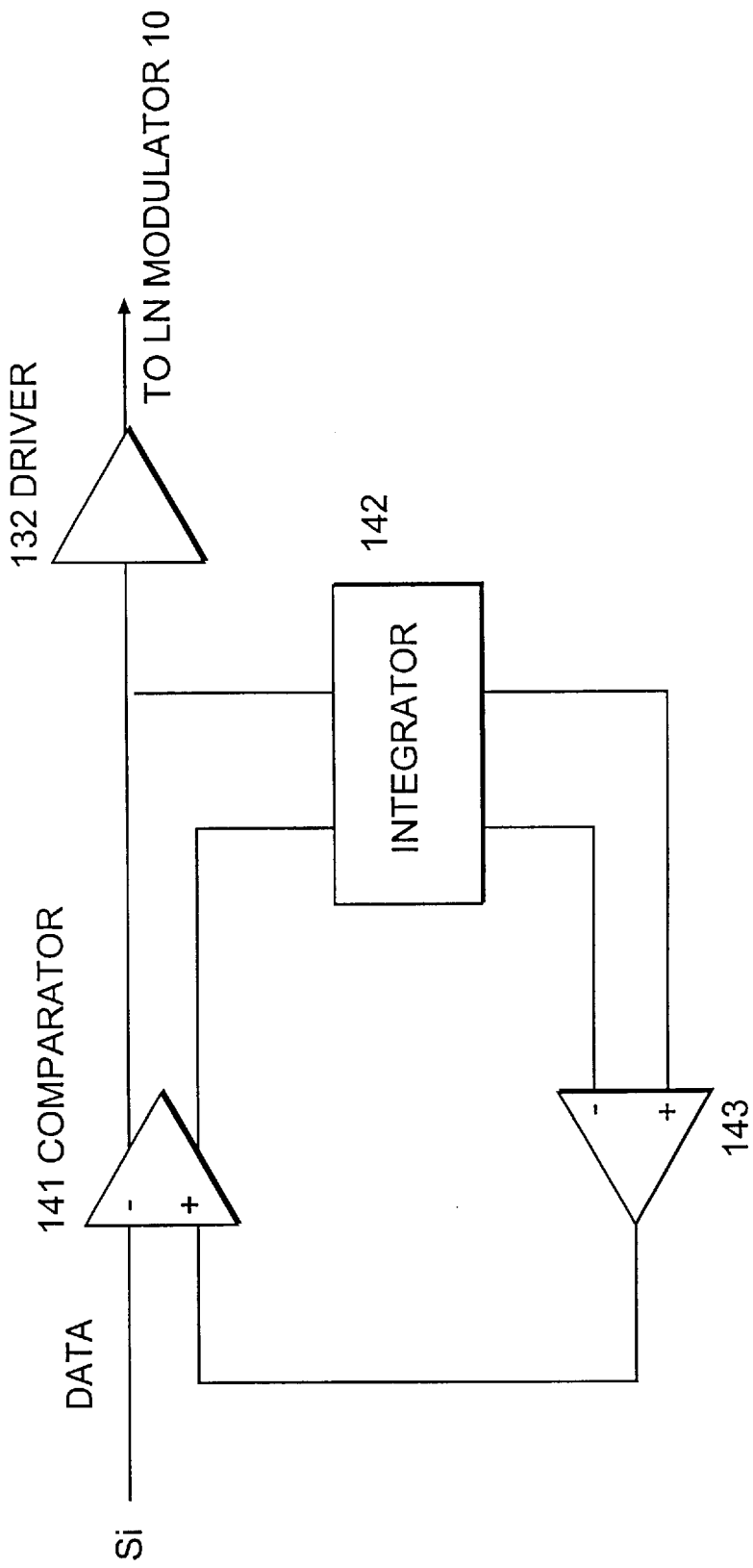

Next, a second embodiment of the present invention will be described. The structure of a controller according to this second embodiment is shown in is described in FIG. 12. In this embodiment, a driver 17 is provided in place of the bias voltage limiter 15. The details of structures for the driver 17 are shown in FIG. 13 and FIG. 14. The driver circuit shown in FIG. 13 has a latch 131 to which a data signal Si1 and a clock signal Si2 are inputted. The latch 131 latches the data signal Si1 on the clock signal Si2. The output of the latch 131 is inputted to a driver 132. The output of the driver 132 is provided to the modulation input of the LN modulator 10 via a capacitor 16 as the drive signal S for the LN modulator 10.

The data signal Si1 and the clock signal Si2 are in synchronization with each other. Therefore, by latching the data signal Si1 on the clock signal Si2, the duty ratio of the modulation signal provided to the LN modulator 10 can be fixed regardless of the duty ratio of the data signal Si1.

A further form for the driver 17 is shown in FIG. 14. The data signal Si is inputted to the non-inverting input of a comparator 141. This comparator 141 has two outputs, a non-inverting output and an inverting output. Both of these outputs are connected to an integrator 142 having two outputs. Of these two outputs, the differential voltage signal of the signal provided from the non-inverting output of the comparator 141 is applied to the non-inverting input of an op-amp 143. Further, the differential voltage signal for the signal provided from the inverting output of the comparator 141 is provided to the inverting input of the op-amp 143. The output of the op-amp 143 is connected to inverting input of the comparator 141. The non-inverting output of the comparator 141 is provided to the driver 132.

As a result, the voltage at the inverting input of the comparator 141 is controlled in such a manner that the differential voltage signal of the non-inverting output of the comparator 141 and the differential voltage signal of the inverting output become equal. The duty ratio of the modulation signal provided to the LN modulator 10 is therefore fixed regardless of the duty ratio of the data signal Si.

There is also the advantage that the LN modulator 10 is stabilized to the optimum operating point by suppressing the output amplitude of the driver 132. Changes in the waveforms for the outputted light when d.c. drift occurs at the LN modulator 10 are described using FIG. 15.

First, in FIG. 15(a), when a d.c. drift occurs in the minus direction with the bias voltage going to the LN modulator 10 fixed, the high level of the waveform for the outputted light is reflected and two peaks can be seen rising and falling (FIG. 15(a), (2)). When the d.c. drift changes as far as −Vπ/2, the low level and the high level for the light output waveform become the same and only a peak can be seen between the rise and the fall.

Next, as shown in FIG. 15(b), the amplitude of the output given to the LN modulator 10 by the driver 132 is made small. First, in the case in FIG. 15(b), the average value of the light outputted from the LN modulator 10 is half that at the time of the ALL mark. When the modulation voltage fluctuates as in (2) and (3) due to d.c. drift, an accompanying increase in the average value of the outputted light follows. In (3), the average value becomes a maximum. If the d.c. voltage then further drifts to Vπ (in the minus direction) from the conditions in (3), the average value of the outputted light becomes a minimum.

Changes in the average value of the outputted light become bigger as a result of suppressing the amplitude of the driver output, as becomes clear from comparing FIG. 15(a) and FIG. 15(b). Namely, the precision with which the d.c. voltage drift is be monitored can be improved accordingly and the LN modulator 10 can therefore be stabilized at the optimum operating point in an effective manner against fluctuations of insertion loss at the LN modulator, etc.

What is claimed is:

1. A driving circuit for an optical signal modulator, comprising:
    an input level monitor for monitoring a level of optical input power;
    an output level monitor for monitoring a level of optical output power;
    feedback means, connected to the input level monitor and the output level monitor, for controlling a bias-voltage provided to the optical signal modulator; and
    driver means for applying a drive signal to the optical signal modulator, wherein an amplitude of the drive signal is suppressed.

2. A driving circuit for an optical signal modulator, comprising:
    an input level monitor for monitoring a level of optical input power;
    an output level monitor for monitoring a level of optical output power;
    feedback means, connected to the input level monitor and the output level monitor, for controlling a bias voltage provided to the optical signal modulator; and
    a bias-voltage limiter for setting a voltage control range of the optical signal modulator, wherein the bias-voltage limiter includes
        a difference monitor for detecting the bias-voltage;
        an offset-voltage generator, connected to the difference monitor, for generating an offset-voltage in accordance with the bias-voltage, and;
        a voltage limiter for limiting the operating output range of the feedback means to a predetermined voltage range.

3. A driving circuit for an optical signal modulator, comprising:
    an input level monitor for monitoring a level of optical input power;
    an output level monitor for monitoring a level of optical output power;
    feedback means, connected to the input level monitor and the output level monitor, for controlling a bias voltage provided to the optical signal modulator; and
    driver means for stabilizing a duty ratio of a drive signal and applying the stabilized drive signal to the optical signal modulator.

4. A driving circuit for an optical signal modulator having an input portion and an output portion, comprising:
    a first optical device arranged at the input portion of the optical signal modulator, which generates a first power signal corresponding to optical power of light received at the first optical device;
    a second optical device arranged at the output portion of the optical signal modulator, which generates a second power signal corresponding to optical power of light received from the optical signal modulator;
    a feedback circuit connected to the first optical device and the second optical device, which provides to the optical signal modulator an operating output signal, wherein the operating output signal includes a bias-voltage generated in accordance with the first power signal and the second power signal; and
    a bias-voltage limiter which detects the bias-voltage and generates an offset-voltage in accordance with the bias-voltage to limit an operating output range of the feedback circuit to a predetermined feedback voltage range.

5. A driving circuit for an optical signal modulator according to claim 4, wherein the bias-voltage limiter comprises:
    a voltage limiter connected to the feedback circuit which limits the bias-voltage to a predetermined bias-voltage range;
    an integrator circuit which receives a difference signal and provides an offset-voltage to the voltage limiter for shifting the predetermined bias-voltage range in accordance with the offset-voltage; and
    a difference signal generator which detects a difference between the limited bias-voltage and the offset-voltage and generates the difference signal in accordance with the difference.

6. A driving circuit for an optical signal modulator according to claim 4, wherein the optical signal modulator is a Mach-Zehender-type optical modulator.

7. A driving circuit for an optical signal modulator according to claim 4, wherein the optical signal modulator is a Lithium Niobate optical modulator.

* * * * *